J. E. PINGUELY.
SPRING WHEEL.
APPLICATION FILED SEPT. 3, 1913.
1,096,749.
Patented May 12, 1914.
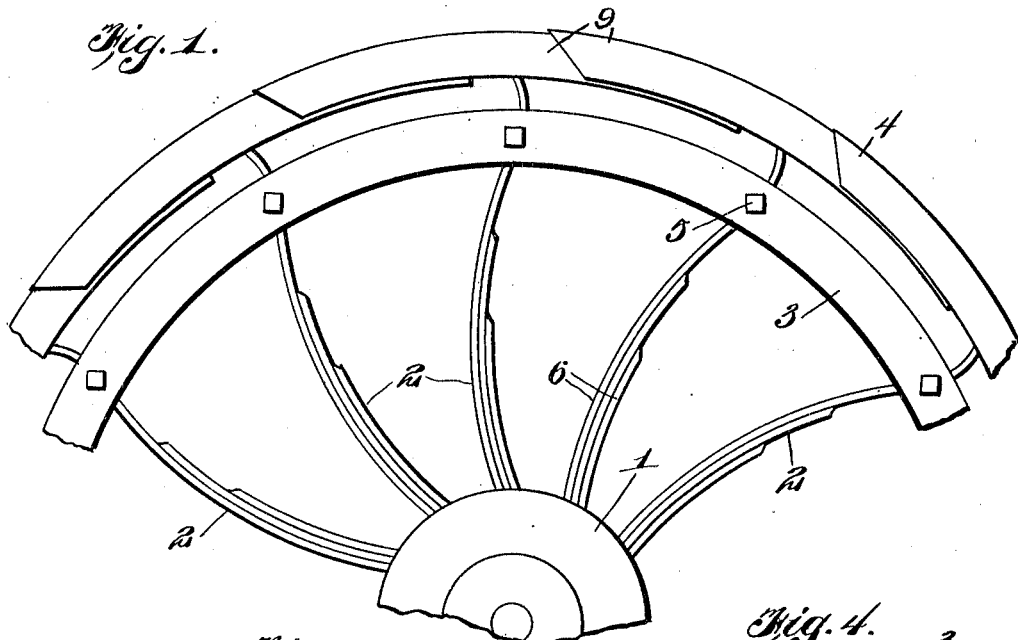
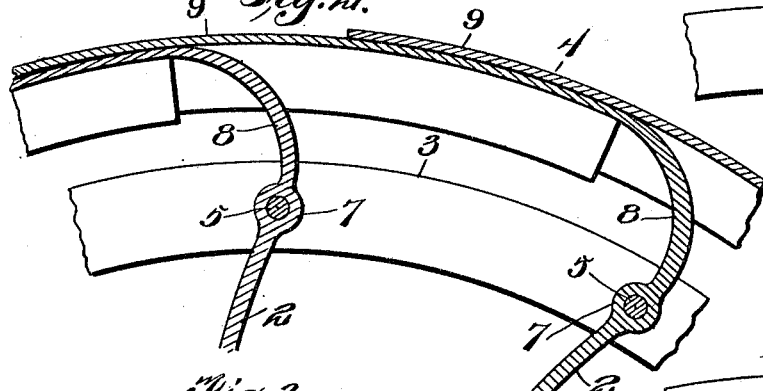
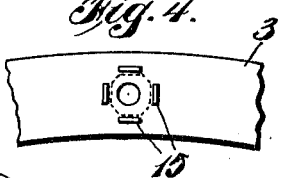
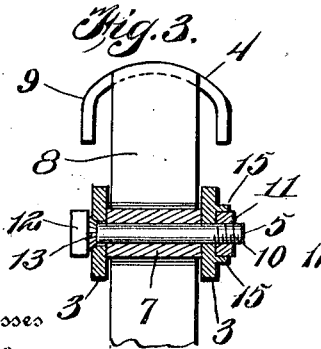
Inventor
Julius E. Pinguely
Witnesses
By Victor J. Evans
Attorney

UNITED STATES PATENT OFFICE.

JULIUS E. PINGUELY, OF MELBOURNE, KENTUCKY.

SPRING-WHEEL.

1,096,749.  Specification of Letters Patent.  Patented May 12, 1914.

Application filed September 3, 1913. Serial No. 787,957.

*To all whom it may concern:*

Be it known that I, JULIUS E. PINGUELY, a citizen of the United States, residing at Melbourne, in the county of Campbell and State of Kentucky, have invented new and useful Improvements in Spring-Wheels, of which the following is a specification.

This invention relates to spring wheels, the object in view being to produce a wheel, the construction of which will provide for taking up all road shocks and preventing the transmission of the same to the axles and body of the machine, thereby doing away with the pneumatic tire now in common use and all of the troubles such as punctures and blow outs to which such tires are always subjected.

The main object of the present invention is to provide an all metal construction of wheel capable of producing the results above noted.

With the above and other objects in view, the invention consists in the construction, combination and arrangement of parts, as will hereinafter be more fully described, illustrated and claimed.

In the accompanying drawings: Figure 1 is a side elevation of a sufficient portion of a vehicle wheel to illustrate the present invention. Fig. 2 is a longitudinal section on an enlarged scale through the outer portion of the wheel including the rim, the tread or tire, and portions of the spokes and spring extensions. Fig. 3 is a cross section through the same. Fig. 4 is a detail side elevation of a portion of one of the rim sections. Fig. 5 is a similar view of the other section. Fig. 6 is a detail view of one of the rim and spring bolts.

Referring to the drawings 1 designates a wheel hub, 2 the spokes, 3 the rim and 4 the outer tread or tire.

In carrying out the present invention, the rim 3 is composed of two circular rings or plates of equal diameter spaced a suitable distance apart in accordance with the size of the tire and secured in rigid relation to each other by means of bolts 5 extending transversely through both of said rim sections.

Each spoke 2 consists of a leaf spring, or in other words a spring comprising a suitable number of leaves 6 of varying length whereby the inner end of the spoke is stiffer, the spoke increasing in its spring action or resiliency toward the outer end thereof where it is provided with an eye or knuckle 7 through which one of the bolts 5 is inserted, the rim and spokes being connected together by means of said bolts while the eye or knuckle serves as a spacing element to hold the rim sections 3 at the proper distance apart.

Each of the spokes 2 is provided with a terminal extension 8 which projects beyond or outside of the rim and forms a tread spring for supporting one of the sections of the tread, said spring also assisting in the support of the adjacent tread sections. The tread or tire 4 is composed of a plurality or circular series of sections 9 each of which is substantially semi-cylindrical in cross section with the convex side disposed outward to form the bearing surface or tread of the wheel. It will further be noted by reference to Fig. 2 that all of the tread sections 9 are arranged in overlapping relation to each other and this overlap is carried out to such an extent that each tread section practically overlaps one-half of each adjoining section. Therefore, a double thickness of metal is presented at all points around the tread of the wheel or tire while admitting of the necessary flexibility to accommodate all road shocks without bending or injuring the tread sections and their supporting springs. It will be observed that the bolts 5 support the outer ends of the spokes relatively to the rim sections, said bolts also serving as supports for the spoke extensions or tread springs 8 and thereby all of the parts are kept in perfect alinement and working condition by the bolts 5.

In the preferred embodiment of the invention, each of the bolts 5 is formed as shown in the detail view Fig. 6; in other words each bolt is provided with a threaded end 10 to receive a nut 11 and is also provided with a head 12 and a tapered and serrated shoulder 13 which is adapted to engage an internally toothed or serrated hole 14 in one of the rim sections 3 so as to prevent the turning of said bolt. The other rim section is provided with nut engaging shoulders or lugs 15 to prevent the nut 11 from turning. The nut 11 is first placed between the locking shoulders or lugs 15 and the bolt 5 is then inserted through the openings in both rim sections and screwed tightly into the nut 11. When the bolt is turned up tightly, the serrated and inclined shoulder 13 engages the teeth or serrations 14 and thereby the bolt is held firmly and prevented from working loose. At the same time the bolt may be removed by bringing sufficient pressure to bear thereon with the aid of a suitable wrench. It will also be noted by reference to Fig. 3 that the tread sections are wider than the rim. Therefore under excessive impacts or road shocks, the rim sections will be supported by the tread sections when the springs or extensions 8 are fully compressed or pressed toward the rim to the full limit of their movement.

What I claim is:

1. A wheel comprising a hub, a rim consisting of two annular sections arranged in spaced relation to each other and of equal diameter, spring spokes fastened at their inner ends to the hub and provided with eyes interposed between the rim sections, bolts inserted through the rim sections and the eyes of the spokes, spring extensions formed integrally with the outer ends of said spokes, and a tread composed of metal sections bearing an overlapping relation to each other, each of said tread sections being supported by one of the spring extensions of the spokes.

2. A wheel comprising a hub, a rim consisting of two annular sections arranged in spaced relation to each other and of equal diameter, spring spokes fastened at their inner ends to the hub and provided with eyes interposed between the rim sections, bolts inserted through the rim sections and the eyes of the spokes, spring extensions formed integrally with the outer ends of said spokes and a tread composed of metal sections bearing an overlapping relation to each other, each of said tread sections being supported by one of the spring extensions of the spokes, each of said spokes embodying a plurality of leaves of different lengths.

3. A wheel comprising a hub, a rim consisting of two annular sections arranged in spaced relation to each other and of equal diameter, spring spokes fastened at their inner ends to the hub and provided with eyes interposed between the rim sections, bolts inserted through the rim sections and the eyes of the spokes, spring extensions formed integrally with the outer ends of said spokes and a tread composed of metal sections bearing an overlapping relation to each other, each of said tread sections being supported by one of the spring extensions of the spokes, the tread sections being of greater width transversely of the wheel rim, whereby the tread sections are adapted to support the wheel rim under excessive impacts.

In testimony whereof I affix my signature in presence of two witnesses.

JULIUS E. PINGUELY.

Witnesses:
JAMES GEYER,
J. F. GOOD.

Copies of this patent may be obtained for five cents each, by addressing the "Commissioner of Patents, Washington, D. C."